United States Patent
Rudisill (10) Patent No.: US 6,797,655 B2
(45) Date of Patent: Sep. 28, 2004

(54) MELTBLOWN WEB

(75) Inventor: Edgar N. Rudisill, Nashville, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 203 days.

(21) Appl. No.: 09/852,380

(22) Filed: May 10, 2001

(65) Prior Publication Data

US 2002/0025748 A1 Feb. 28, 2002

Related U.S. Application Data

(60) Provisional application No. 60/203,686, filed on May 11, 2000.

(51) Int. Cl.[7] .................................................. D04H 1/56
(52) U.S. Cl. ....................... 442/400; 442/361; 442/362; 442/364
(58) Field of Search ................................. 442/400, 361, 442/362, 364

(56) References Cited

U.S. PATENT DOCUMENTS

| 4,508,113 A | 4/1985 | Malaney ..................... 128/849 |
| 4,547,420 A | 10/1985 | Krueger et al. ............. 442/347 |
| 4,657,804 A | 4/1987 | Mays et al. .................. 428/212 |
| 4,729,371 A | 3/1988 | Krueger et al. ......... 128/206.19 |
| 4,795,668 A | 1/1989 | Krueger et al. ............. 428/174 |
| 5,364,694 A | 11/1994 | Okada et al. ................ 442/347 |
| 6,057,256 A | 5/2000 | Krueger et al. ............. 442/400 |
| 6,667,254 B1 | 12/2003 | Thompson, Jr. et al. |

FOREIGN PATENT DOCUMENTS

| GB | 2121423 A | 12/1983 |
| JP | 02 104755 A | 7/1990 |
| JP | 11 107154 A | 4/1999 |
| WO | WO 01 09425 A1 | 2/2001 |

OTHER PUBLICATIONS

G. S. Bhat, V. Zhang, M. Dever, L. C. Wadswords, Processing of Post–Consumer Recycled PET Into Melt Blown Nonwoven Webs, *International Nonwoven Journal*, 1984, pp. 54–61, vol. 6, No. 3.

*Primary Examiner*—Terrel Morris
*Assistant Examiner*—Norca L. Torres (57) ABSTRACT

A meltblown fiber comprising at least 20% by weight polyester selected from the group consisting of poly(ethylene terephthalate) having an intrinsic viscosity of less than 0.55 dl/g and poly(trimethylene terephthalate) having an intrinsic viscosity of less than 0.80 dl/g is provided. The meltblown fibers are collected as a web that can be incorporated into composite sheet structures.

20 Claims, 2 Drawing Sheets

MELTBLOWN WEB

BACKGROUND OF THE INVENTION

1. Field of the Invention

This invention relates to meltblown fibers, meltblown fiber webs, and composite nonwoven fabrics that include meltblown fibers. The meltblown webs of the invention can be incorporated in composite fabrics suited for use in apparel, wipes, hygiene products, and medical wraps.

2. Description of Related Art

In a meltblowing process, a nonwoven web is formed by extruding molten polymer through a die and then attenuating and breaking the resulting filaments with a hot, high-velocity gas stream. This process generates short, very fine fibers that can be collected on a moving belt where they bond with each other during cooling. Meltblown webs can be made that exhibit very good barrier properties.

Meltblown fibers are most typically spun from polypropylene. Other polymers that have been spun as meltblown fibers include polyethylene, polyamides, polyesters, and polyurethanes. Polyester polymers, such as poly(ethylene terephthalate) ("PET") and poly(trimethylene terephthalate) ("PTT"), are not well adapted for making fine meltblown fibers. In addition, due to polyester's low degree of crystallization when formed in meltblown webs and due to polyester's low crystallization temperature, thermally bonded meltblown polyester webs tend to be brittle and they exhibit relatively poor fluid barrier properties, especially when subjected to mechanical stress. U.S. Pat. No. 5,364,694 discloses the meltblowing of a blend of PET with another thermoplastic polymer, such as polyethylene, which is incompatible with PET and has a high crystallization rate and a low melt viscosity. The second polymer produces a "viscosity-reducing effect" that decreases the melt viscosity of the entire blend, so as to facilitate attenuation of PET when meltblown. U.S. Pat. No. 4,795,668 discloses the meltblowing of bicomponent fibers wherein one component is PET and the other component is a more thermally stable polymer such as polypropylene or polystyrene.

Meltblown fibers have been incorporated into a variety of nonwoven fabrics including composite laminates such as spunbond-meltblown-spunbond ("SMS") composite sheets. In SMS composites, the exterior layers are spunbond fiber layers that contribute strength to the overall composite, while the core layer is a meltblown fiber layer that provides barrier properties. Traditionally, the spunbond and meltblown layers of SMS composites have been made of polypropylene fibers. For certain end use applications, such as medical gowns, it is desirable that SMS composite sheets have good strength and barrier properties, while also being as soft and drapeable as possible. While polypropylene-based SMS fabrics offer good strength and barrier properties, they tend not to be as soft and drapeable as is desirable for apparel products. Polypropylene-based SMS fabrics also have the limitation that they cannot be sterilized with gamma radiation because such fabrics are discolored and weakened when sterilized with gamma radiation, and because gamma radiation sterilization of polypropylene-based SMS fabrics generates unpleasant odors. A polymer fiber or fabric is generally considered to be not radiation sterilizable when sterilization of the fabric with gamma radiation causes a significant reduction in the strength of the fiber or fabric, noticeably changes the appearance of the fiber or fabric, or generates an objectionable odor. This inability to undergo gamma radiation sterilization presents a significant problem for polypropylene-based SMS fabrics because radiation sterilization is commonly used throughout the medical industry.

There is a need for finer polyester meltblown fibers that when formed into webs exhibit good barrier properties. There is a further need for meltblown polyester webs that are pliable and do not experience a significant loss in barrier properties when mechanically stressed.

BRIEF SUMMARY OF THE INVENTION

The present invention is directed to a meltblown fiber and a web of meltblown fibers. The meltblown fiber of the invention comprises at least 20% by weight polyester selected from the group consisting of poly(ethylene terephthalate) having an intrinsic viscosity of less than 0.55 dl/g, and poly(trimethylene terephthalate) having an intrinsic viscosity of less than 0.80 dl/g. The meltblown fiber of the invention has an average effective diameter of less than 10 microns. Preferably, the intrinsic viscosity of the poly(ethylene terephthalate) is in the range of 0.20 to 0.50 dl/g and the intrinsic viscosity of the poly(trimethylene terephthalate) is in the range of 0.45 to 0.75 dl/g. More preferably, the intrinsic viscosity of the poly(ethylene terephthalate) is in the range of 0.25 to 0.45 dl/g and the intrinsic viscosity of the poly(trimethylene terephthalate) is in the range of 0.50 to 0.70 dl/g. Meltblown fibers of the invention are preferably formed into a meltblown web.

According to one preferred embodiment of the invention, the meltblown fiber is a multiple component fiber comprised of between 20% and 98% by weight of poly(ethylene terephthalate) and between 80% and 2% by weight of a second polymer component comprised of at least 10% of polyethylene polymer. Meltblown fibers of the invention are preferably formed into a multiple component meltblown web comprised of between 20% and 98% by weight of poly(ethylene terephthalate) and between 80% and 2% by weight of a second polymer component comprised at least 10% by weight of polyethylene polymer.

The present invention is also directed to a composite sheet having a first fibrous layer having a first side and an opposite second side, and a second fibrous layer bonded to the first side of the first fibrous layer. The first fibrous layer is a meltblown web comprised of at least 20% by weight polyester selected from the group consisting of poly(ethylene terephthalate) having an intrinsic viscosity of less than 0.55 dl/g, and poly(trimethylene terephthalate) having an intrinsic viscosity of less than 0.80 dl/g. The second fibrous layer is preferably comprised of at least 95% by weight of meltspun fibers. In the preferred embodiment of the invention, the composite sheet has a basis weight of less than 120 g/m$^2$, and a hydrostatic head of at least 10 cm. According to a more preferred embodiment of the invention, at least 10% of the meltblown fibers in the first fibrous layer are multiple component fibers. More preferably the multiple component meltblown fibers have a low intrinsic viscosity polyester component and a polyethylene component. According to the invention, the meltspun fibers of the second fibrous layer can be multiple component fibers having a polyester component and a polyethylene component. The invention is also directed to garments made of the composite sheet of the invention.

The present invention is also directed to a meltblown fiber comprising at least 20% by weight polyester having a weight average molecular weight of less than 25,000. Preferably, the polyester has a weight average molecular weight in the range of 5,000 to 22,000. More preferably, the polyester has a weight average molecular weight in the range of 10,000 to 19,000.

DEFINITIONS

The term "polymer" as used herein, generally includes homopolymers, copolymers (such as for example, block, graft, random and alternating copolymers), terpolymers, and blends and modifications thereof. Furthermore, unless otherwise specifically limited, the term "polymer" shall include all possible geometrical configurations of the material. These configurations include isotactic, syndiotactic and random symmetries.

The term "polyethylene" as used herein is intended to encompass not only homopolymers of ethylene, but also copolymers wherein at least 85% of the recurring units are ethylene units.

The term "polypropylene" as used herein is intended to embrace not only homopolymers of propylene but also copolymers wherein at least 85% of the recurring units are propylene units.

The term "polyester" as used herein is intended to embrace polymers wherein at least 85% of the recurring units are condensation products of dicarboxylic acids and dihydroxy alcohols with polymer linkages created by formation of an ester unit. This includes aromatic, aliphatic, saturated, and unsaturated di-acids and di-alcohols. The term "polyester" as used herein also includes copolymers (such as block, graft, random and alternating copolymers), blends, and modifications thereof. A common example of a polyester is poly(ethylene terephthalate) which is a condensation product of ethylene glycol and terephthalic acid.

The term "meltspun fibers" as used herein means fibers which are formed by extruding molten thermoplastic polymer material as filaments from a plurality of fine, usually circular, capillaries of a spinneret with the diameter of the extruded filaments then being rapidly reduced. Meltspun fibers are generally continuous and have an average diameter of greater than about 5 microns.

The term "meltblown fibers" as used herein means fibers formed by extruding a molten thermoplastic polymer through a plurality of fine, usually circular, capillaries as molten threads or filaments into a high velocity gas (e.g. air) stream. The high velocity gas stream attenuates the filaments of molten thermoplastic polymer material to reduce their diameter to between about 0.5 and 10 microns. Meltblown fibers are generally discontinuous fibers. Meltblown fibers carried by the high velocity gas stream are normally deposited on a collecting surface to form a web of randomly dispersed fibers.

The term "spunbond fibers" as used herein, means fibers that are formed by extruding molten thermoplastic polymer material as filaments from a plurality of fine capillaries of a spinneret, drawn, randomly deposited onto a screen and bonded together.

The term "nonwoven fabric, sheet or web" as used herein means a structure of individual fibers or threads that are positioned in a random manner to form a planar material without an identifiable pattern, as in a knitted fabric.

The term "multiple component meltblown web" as used herein means meltblown fibers spun from fine capillaries as molten filaments containing multiple and distinct polymer components, which molten filaments are attenuated by a high velocity gas stream and deposited on a collecting surface as a web of randomly dispersed fibers.

As used herein, the "machine direction" is the long direction within the plane of a sheet, i.e., the direction in which the sheet is produced. The "cross direction" is the direction within the plane of the sheet that is perpendicular to the machine direction.

TEST METHODS

In the description above and in the examples that follow, the following test methods were employed to determine various reported characteristics and properties. ASTM refers to the American Society for Testing and Materials, and AATCC refers to the American Association of Textile Chemists and Colorists.

Intrinsic Viscosity (IV) is a measure of the inherent resistance to flow for a polymer solution and was determined by ASTM 0-2857, which is hereby incorporated by reference, and is reported in dl/g. The solvent and temperature used to study the intrinsic viscosity of poly(ethylene terephthalate) in a glass capillary viscometer was hexafluoroisopropanol with 0.01 M sodium trifluoroacetate at 35° C. The solvent and temperature used to study the intrinsic viscosity of poly(trimethylene terephthalate) in a glass capillary viscometer was orthochlorophenol at 25° C.

Weight Average Molecular Weight was measured using size exclusion chromatography analysis with a triple detector system. This system allows an absolute molecular weight to be measured independent of the type of calibration standards. The molecular weight averages for poly(ethylene terephthalate) were determined in hexafluoroisopropanol with 0.01 M sodium trifluoroacetate using an injection volume of 100 microliters operating at 1.000 mL/min flow rate at 35 C.

Fiber Diameter was measured via optical microscopy and is reported as an average value in microns.

Basis Weight is a measure of the mass per unit area of a fabric or sheet and was determined by ASTM D-3776, which is hereby incorporated by reference, and is reported in $g/m^2$.

Grab Tensile Strength is a measure of the breaking strength of a sheet and was conducted according to ASTM D 5034, which is hereby incorporated by reference, and is reported in Newtons.

Hydrostatic Head is a measure of the resistance of a sheet to penetration by liquid water under a static pressure. The test was conducted according to AATCC-127, which is hereby incorporated by reference, and is reported in centimeters.

Frazier Air Permeability is a measure of air flow passing through a sheet under a stated pressure differential between the surfaces of the sheet and was conducted according to ASTM D 737, which is hereby incorporated by reference, and is reported in $m^3/min/m^2$.

Water Impact is a measure of the resistance of a sheet to the penetration of water by impact and was conducted according to AATCC 42-1989, which is hereby incorporated by reference, and is reported in grams.

DETAILED DESCRIPTION OF THE INVENTION

Reference will now be made in detail to the presently preferred embodiments of the invention, examples of which are illustrated below. The present invention is directed to meltblown polyester fibers that are spun from lower viscosity polyesters in order to obtain finer fibers. As embodied herein, the meltblown fibers are comprised of at least 20% by weight polyester selected from the group consisting of poly(ethylene terephthalate) having an intrinsic viscosity of less than 0.55 dl/g, and poly(trimethylene terephthalate) having an intrinsic viscosity of less than 0.80 dl/g. The intrinsic viscosity of poly(ethylene terephthalate) polyester that has been meltblown in the past has generally been in the range of 0.65 to 0.80 dl/g. The intrinsic viscosity or "IV" of a polymer is an indicator of the polymer's molecular weight, with a higher IV being indicative of a higher molecular weight. Poly(ethylene terephthalate) with an IV below about 0.55 dl/g is considered to be a "low IV" polyester. Poly (trimethylene terephthalate)("PTT") with an IV below about 0.80 dl/g is considered to be a "low IV" polyester. The low IV polyesters useful in the present invention have weight average molecular weights of less than 25,000. Preferably, the polyester has a weight average molecular weight in the range of 5,000 to 22,000. More preferably, the polyester has a weight average molecular weight in the range of 10,000 to 19,000.

Low IV polyester has not been used in making meltblown fibers or webs. It has been found that when low IV polyester is meltblown, the fibers produced have a smaller diameter than fibers meltblown from conventional IV polyester. These smaller diameter fibers provide improved barrier properties when used in composite SMS fabrics.

According to the invention, the fine polyester meltblown fibers of the invention are produced according to a conventional meltblowing process. In the meltblowing process, one or more extruders supply melted polymer to a die tip where the polymer is fiberized as it passes through fine capillary openings to form a curtain of filaments. The filaments are pneumatically drawn and normally broken by a jet of air around the fine capillary openings in the die. The fibers are deposited on a moving belt or screen, a scrim, or another fibrous layer. Fibers produced by melt blowing are generally discontinuous fibers having an effective diameter in the range of about 0.5 to about 10 microns. As used herein, the "effective diameter" of a fiber with an irregular cross section is equal to the diameter of a hypothetical round fiber having the same cross sectional area.

In order to make thermally bonded meltblown polyester webs that are more pliable and durable, the meltblown fibers can be spun as multiple component fibers wherein one of the fiber components is comprised of low IV polyester. The fibers in the multiple component meltblown web of the invention are typically discontinuous fibers having an average effective diameter of between about 0.5 microns and 10 microns, and more preferably between about 1 and 6 microns, and most preferably between about 2 and 4 microns. Multiple component meltblown webs are formed from at least two polymers simultaneously spun from a spin pack. Preferably, the multiple component meltblown web is a bicomponent web made from two polymers. The configuration of the fibers in the bicomponent web is preferably a side-by-side arrangement in which most of the fibers are made of two side-by-side polymer components that extend for a significant portion of the length of each fiber. Alternatively, the bicomponent fibers may have a sheath/core arrangement wherein one polymer is surrounded by another polymer, an "islands-in-the-sea" arrangement in which multiple strands of one polymer are imbedded in another polymer, or any other conventional bicomponent fiber structure. Without wishing to be bound by theory, it is believed that the attenuation of the meltblown fibers can actually fracture the multiple component filaments into even finer filaments, some of which can contain only one polymer component.

According to the invention, the second polymer component of the multiple component meltblown web comprises one or more fiber forming synthetic polymers that are more pliable than polyester. Preferably, the second component has a melt temperature less than the melt temperature of the first component so as to help bind the meltblown fibers upon thermal bonding, which results in a more pliable web. Preferably, the other polymer or polymers are gamma radiation stable polymers such as polyethylene. Alternatively, the second polymer component can be a non-radiation sterilizable polymer such as polypropylene if the end use for the sheet does not require that the sheet be radiation sterilizable.

The preferred multiple component meltblown web of the invention is a bicomponent meltblown web comprised of low IV PET and polyethylene. Preferably, the low IV PET component comprises from 20% to 98% by weight of the meltblown web and the polyethylene component comprises from 2% to 80% by weight of the meltblown web. More preferably, the low IV PET component comprises from 55% to 98% by weight of the meltblown web and the polyethylene component comprises from 2% to 45% by weight of the meltblown web. Even more preferably, the low IV PET component comprises from 65% to 97% by weight of the meltblown web and the polyethylene component comprises from 3% to 35% by weight of the meltblown web. Most preferably, the low IV PET component comprises from 80% to 95% by weight of the meltblown web and the polyethylene component comprises from 5% to 20% by weight of the meltblown web.

Figure 1:
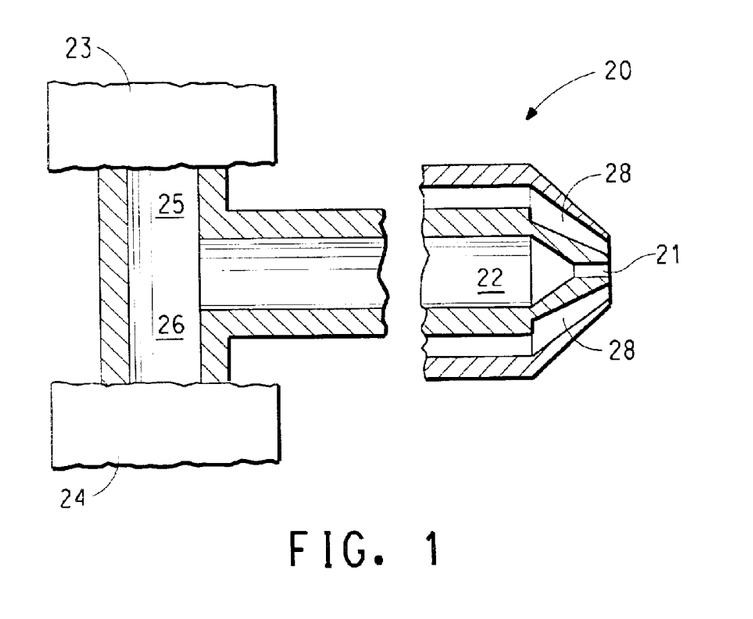
FIG. 1 is a schematic diagram of a portion of an apparatus used for producing meltblown fibers for use in the composite nonwoven fabric of the invention.

The fibers of the meltblown web of the invention can be meltblown using a meltblowing apparatus having capillary die openings like that shown in FIG. 1 and more fully described in U.S. Pat. No. 4,795,668, which is hereby incorporated by reference. In the sectional view of a meltblowing die 20 shown in FIG. 1, two different polymeric components are melted in parallel extruders 23 and 24 and metered separately through gear pumps (not shown) and conduits 25 and 26 into the die cavity 22. In the die cavity, the polymer components form a layered mass in which the two components segregate as discrete layers. The layered mass is extruded through a line of capillary orifices 21. Where single component fiber is desired, the same polymer is supplied by the two extruders 23 and 24, or just one extruder is used. A jet of hot air supplied from the channels 28 attenuates the emerging polymer filaments. Without wishing to be bound by theory, it is believed that the air jet may fracture the filaments into even finer filaments. The resulting filaments are believed to include bicomponent filaments in which each filament is made of two separate polymer components that both extend the length of the meltblown fiber in a side-by-side configuration. The fine fibers of layer 14 could alternatively be produced by other know meltblowing processes, as for example by the process wherein an individual air nozzle surrounds each polymer capillary, as disclosed in U.S. Pat. No. 4,380,570.

Figure 2:
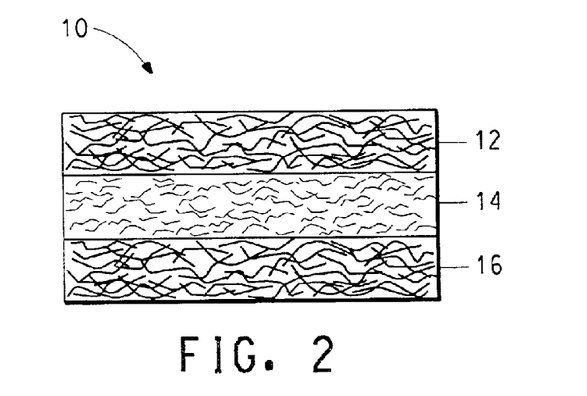
FIG. 2 is a diagrammatical cross-sectional view of a composite nonwoven fabric in accordance with one embodiment of the invention.
Figure 3:
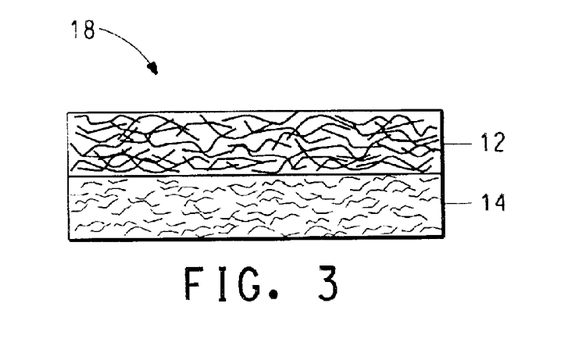
FIG. 3 is a diagrammatical cross-sectional view of a composite nonwoven fabric in accordance with another embodiment of the invention.

A composite nonwoven sheet incorporating the meltblown web of the invention is shown in FIG. 2. The sheet 10 is a three layer composite fabric in which an inner layer 14 is comprised of very fine meltblown polymer fibers sandwiched between outer layers 12 and 16, which are each comprised of larger and stronger and bonded fibers. The very fine fibers of inner layer 14, when formed into the layer 14, produce a barrier layer with extremely fine passages. The layer 14 acts as a barrier to fluids but does not prevent the passage of moisture vapor. The bonded fiber layers 12 and 16 are comprised of coarser and stronger fibers that contribute strength, and in some instances barrier, to the composite sheet. A composite sheet may alternatively be formed as a two layer composite 18, as shown in FIG. 3. In the two layer composite sheet, the fine meltblown fiber layer 14 is attached on just one side to the coarser and stronger bonded layer 12. According to alternative embodiments of the invention, the composite sheet may be made with multiple layers of fine meltblown fibers like the layer 14, or it may be made with more than two layers of coarser and stronger fiber layers like the layers 12 and 16.

The larger and stronger bonded fibers of the layers 12 and 16 are preferably conventional meltspun fibers or some other type of strong spunbond fiber. Preferably, the meltspun fibers are substantially continuous fibers. Alternatively, the layers 12 and 16 could be an air-laid or wet-laid staple fiber web or a carded web wherein the fibers are bonded to each other to form a strong web structure. The fibers of layers 12 and 16 should be made of a polymer to which polyethylene-containing fine fibers of the core layer 14 can readily bond. The fibers of layers 12 and 16 are preferably gamma radiation sterilizable in that they have an outer layer comprised of a polymer other than polypropylene, such as polyester, polyethylene, polyamide, or some combination thereof. Where the composite fabric will not be used in end use applications where radiation sterilization is used, the fibers of layers 12 and 16 could also be comprised of a polymer such as polypropylene that is not gamma radiation sterilizable.

A preferred meltspun fiber for the layers 12 and 16 is a bicomponent fiber comprised of polyester and polyethylene. The polyester component contributes to the strength to the fabric while the polyethylene component makes the fabric softer and more drapable. In addition, the polyethylene component has a lower melting temperature than the polyester component of the fiber so as to make the layers 12 and 16 more readily bondable to the fine meltblown fibers of the core layer 14 using a thermal bonding process. Alternatively, layers 12 and 16 could be comprised of a blend of single polymer component fibers, as for example, a spunbond web wherein a portion of the fibers are polyethylene fibers and a portion of the fibers are polyester fibers.

Preferably, the larger and stronger fibers of the layers 12 and 16 are substantially continuous spunbonded fibers produced using a high speed melt spinning process, such as the high speed spinning processes disclosed in U.S. Pat. Nos. 3,802,817; 5,545,371; and 5,885,909; which are hereby incorporated by reference. According to the preferred high speed melt spinning process, one or more extruders supply melted polymer to a spin pack where the polymer is fiberized as it passes through openings to form a curtain of filaments. The filaments are partially cooled in an air quenching zone. The filaments are then pneumatically drawn to reduce their size and impart increased strength. The filaments are deposited on a moving screen, belt, scrim or other fibrous layer. Fibers produced by the preferred high speed melt spinning process are substantially continuous and have a diameter of from 5 to 30 microns. These fibers can be produced as single component fibers, as multiple component fibers, or some combination thereof. Multicomponent fibers can be made in various known cross-sectional configurations, including side-by-side, sheath-core, segmented pie, or islands-in-the-sea configurations.

Figure 4:
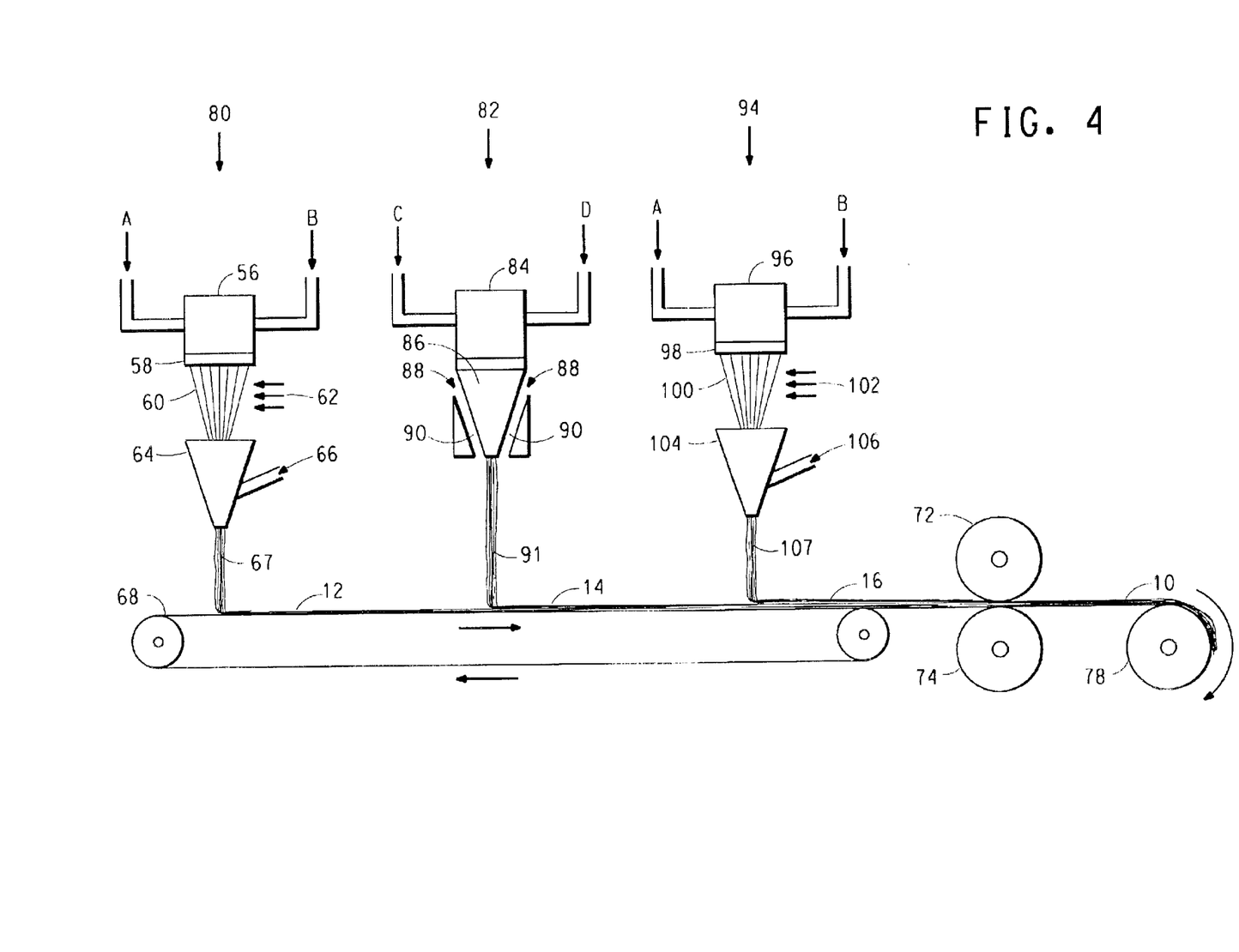
FIG. 4 is schematic illustration of an apparatus for producing the composite nonwoven fabric of the invention.

A composite nonwoven fabric incorporating the low intrinsic viscosity polyester meltblown web described above can be produced in-line using the apparatus that is shown schematically in FIG. 4. Alternatively, the layers of the composite sheet can be produced independently and later combined and bonded to form the composite sheet. The apparatus shown in FIG. 4 includes spunbonded web production sections 80 and 94 well-known in the art. The apparatus of FIG. 4 further includes a meltblown web production section 82 incorporating the meltblowing apparatus described with regard to FIG. 1 above. For purposes of illustration, the two spunbond web production sections 80 and 94 and the meltblown web production section 82 are shown making bicomponent fibers. It is contemplated that the spunbond web production sections 80 and 94 and the meltblown web production section 82 could be replaced by units designed to produce webs having just one polymer component or having three or more polymer components. It is also contemplated that more than one spunbond web production section could be used in series to produce a web made of a blend of different single or multiple component fibers. Likewise, it is contemplated that more than one meltblown web production section could be utilized in series in order to produce composite sheets with multiple meltblown layers. It is further contemplated that the polymer(s) used in the various web production sections could be different from each other. Where it is desired to produced a composite sheet having just one spunbond layer and one fine fiber layer (as shown in FIG. 3), the second spunbond web production section 94 can be turned off or eliminated.

According to the preferred embodiment of the invention, in the spunbond web production sections 80 and 94 of the apparatus shown in FIG. 4, two thermoplastic polymer components A and B are melted, filtered and metered (not shown) to the spin packs 56 and 96. The melted polymer filaments 60 and 100 are extruded from the spin packs through spinneret sets 58 and 98, respectively. The filaments may be extruded as bicomponent filaments having a desired cross section, such as a sheath-core filament cross section. Preferably, a lower melting temperature polymer is used for the sheath section while a higher melting temperature polymer is used for the core section. The resulting filaments 60 and 100 are cooled with quenching air 62 and 102. The filaments next enter pneumatic draw jets 64 and 104 and are drawn by drawing air 66 and 106. The fibers 67 from the spunbond web production section 80 are deposited onto forming screen 68 so as to form a spunbond layer 12 on the belt.

According to the preferred embodiment of the invention, a low intrinsic viscosity polyester polymer and another polymer are combined to make a meltblown bicomponent web in the meltblown web production section 82. The two polymers C and D are melted, filtered, and then metered (not shown) into the spin pack 84. The melted polymers are combined in the spin pack 84 and exit the spin pack through a line of capillary openings 86 like those described above with regard to FIG. 1. Preferably, the spin pack 84 generates the desired side-by-side fiber filament cross section. Alternative spin pack arrangements can be used to produce alternative fiber cross sections, such as a sheath-core cross section. A jet of hot air 88 supplied from the channels 90 impacts on the opposite side of the exiting filaments 91 and attenuates each filament 91 immediately after each filament exits its capillary opening. The meltblown filaments 91 are generally fractured during the attenuation process. The meltblown filament fibers 91 deposit onto spunbond layer 12 to create the multiple component meltblown web layer 14.

Where a second spunbond web production section 94 is used, substantially continuous spunbond fibers 107 from the spunbond web production section 80 are deposited onto the meltblown layer 14 so as to form a second spunbond layer 16 of the composite sheet. The layers 12 and 16 do not necessarily have to have the same thickness or basis weight.

The spunbond-meltblown-spunbond web structure is passed between thermal bonding rolls 72 and 74 in order to produce the composite nonwoven web 10 which is collected on a roll 78. Preferably, the bonding rolls 72 and 74 are heated rolls maintained at a temperature within plus or minus 20° C. of the lowest melting temperature polymer in the composite. For the polyethylene-containing composite sheet of the invention, a bonding temperature in the range of 115–120° C. and a bonding pressure in the range of 350–700 N/cm have been applied to obtain good thermal bonding. Alternative methods for bonding the layers of the composite sheet include calender bonding, through-air bonding, steam bonding, and adhesive bonding.

Optionally, a fluorochemical coating can be applied to the composite nonwoven web to reduce the surface energy of the fiber surface and thus increase the fabric's resistance to liquid penetration. For example, the fabric may be treated with a topical finish treatment to improve the liquid barrier and in particular, to improve barrier to low surface tension liquids. Many topical finish treatment methods are well known in the art and include spray application, roll coating, foam application, dip-squeeze application, etc. Typical finish ingredients include ZONYL® fluorochemical (available from DuPont, Wilmington, Del.) or REPEARL® fluorochemical (available from Mitsubishi Int. Corp, New York, N.Y.). A topical finishing process can be carried out either in-line with the fabric production or in a separate process step. Alternatively, such fluorochemicals could also be spun into the fiber as an additive to the melt.

The composite nonwoven sheet preferably has a basis weight in the range of 10 to 120 g/m$^2$, and more preferably within the range of 30 to 90 g/m$^2$, and most preferably within the range of 50 to 70 g/m. The grab tensile strength of the composite nonwoven sheet can range widely depending on the thermal bonding conditions employed. Typical grab tensile sheet strengths (in both the machine and cross directions) are from 35 to 400 N, and more preferably from 40 to 300 N, and most preferably from 50 to 200 N. The inner meltblown fiber layer of the composite sheet typically has a basis weight of between 2 and 40 g/m$^2$, and more preferably between 5 and 30 g/m$^2$, and most preferably between 12 and 25 g/m$^2$. The outer layer of the composite contributes strength, and is some instances barrier, to the composite nonwoven fabric. Each of the outer layers typically have a basis weight between 3 and 50 g/m$^2$, and more preferably between 8 and 40 g/m$^2$, and most preferably between 12 and 35 g/m$^2$. Preferably, the layers of the composite sheet are secured together by thermal bonding, as for example via the melting of a low melting temperature component polymer in the fine fiber layer 14 and/or the larger fiber layers 12 and 16. According to the preferred embodiment of the invention, the composite sheet exhibits a hydrostatic head of at least 10 cm, and more preferably of at least 25 cm, and yet more preferably of at least 45 cm, and most preferably at least 60 cm. It is further preferred that the composite sheet exhibit a water impact of less than 5 g, and more preferably less than 2 g, and most preferably less than 0.5 g. Finally, it is preferred that the composite sheet has a Frazier Air Permeability greater than 1 m$^3$/min/m$^2$, and more preferably greater than 5 m$^3$/min/m$^2$.

This invention will now be illustrated by the following examples which are intended to illustrate the invention and not to limit the invention in any manner.

EXAMPLES

In Example 1 and Comparative Example A, monocomponent poly(ethylene terephthalate) meltblown fibers were prepared. These fibers were meltblown according to the processes described above with reference to the apparatus shown in FIG. 1 with the same polymer being used in both sides of the bicomponent meltblown spinning apparatus.

In Example 2 and Comparative Example B, monocomponent poly(trimethylene terephthalate) meltblown fibers were prepared. These fibers were meltblown according to the processes described above with reference to the apparatus shown in FIG. 1 with the same polymer being used in both sides of the bicomponent meltblown spinning apparatus.

In Examples 3 and 4, and in Comparative Examples C and D, bicomponent poly(ethylene terephthalate) meltblown fibers were prepared and incorporated into a spunbond-meltblown-spunbond composite sheet. The meltblown fibers were prepared according to the processes described above with reference to the apparatus of FIG. 1 with poly(ethylene terephthalate) being used on one side and polyethylene/poly (butylene terephthalate) blend being used on the other side of the bicomponent meltblown spinning apparatus. A layer of these bicomponent meltblown fibers was sandwiched between spunbond outer layers to make the composite sheet like that shown in FIG. 2. The spunbond layers were each produced individually using a high speed melt spinning process like that described above with regard to the spunbond web production section 80 of the process shown in FIG. 5. However, instead of preparing all of the layers in one continuous process as described with reference to FIG. 5, the spunbond layers were each spun, laid down, and rolled up separately. The two spunbond layers and the meltblown layer were subsequently unrolled, combined, and thermally bonded to produce the spunbond-meltblown-spunbond composite structure.

Example 1

Meltblown monocomponent fibers were made with poly (ethylene terephthalate) available from DuPont as Crystar® polyester (Merge 3949). The poly(ethylene terephthalate) had an intrinsic viscosity of 0.63 dl/g and a weight average molecular weight of 35,600. The poly(ethylene terephthalate) was used as received without any conditioning or drying and had a moisture content of about 1300 ppm. The poly(ethylene terephthalate) polymer was heated to 575° F. (300° C.) in separate extruders. The two polymer components were separately extruded, filtered and metered to a bicomponent spin pack to coalesce into a monocomponent fiber. The die of the spin pack was heated to 600° F. (315° C.). The die had 601 capillary openings arranged in a 24 inch (61 cm) line. The polymer was spun through the each capillary at a polymer throughput rate of 0.80 g/hole/ min. Attenuating air was heated to a temperature of 615° F. (323° C.) and supplied at a rate of 225 standard cubic feet per minute (6.4 m$^3$/min) through two 0.8 mm wide air channels. The two air channels ran the length of the 24 inch line of capillary openings, with one channel on each side of the line of capillaries set back 1 mm from the capillary openings. Both streams of poly(ethylene terephthalate) were supplied to the spin pack at a rate of 12 kg/hr. The filaments were collected on a moving forming screen. As the poly (ethylene terephthalate) was meltblown, hydrolytic and thermal degradation occurred which reduced the molecular weight and hence the intrinsic viscosity of the polymer forming the meltblown fibers. The poly(ethylene terephthalate) in the meltblown fibers had an intrinsic viscosity of 0.34 dl/g and a weight average molecular weight of 16,500. The average fiber diameter is reported in Table 1.

Comparative Example A

Meltblown monocomponent fibers were formed according to the procedure of Example 1 except that the poly(ethylene terephthalate) was dried for 4 hours at 120° C. prior to meltblowing which produced a lower moisture content of about 50 ppm. The poly(ethylene terephthalate) in the meltblown fibers had an intrinsic viscosity of 0.59 dl/g and a weight average molecular weight of 31,000. The average fiber diameter is reported in Table 1.

The undried poly(ethylene terephthalate) with higher moister content of Example 1 yielded a lower weight average molecular weight and a lower intrinsic viscosity after spinning than the dried poly(ethylene terephthalate) with lower moisture content of Comparative Example A. The presence of additional water in the higher moisture content example contributed to greater polymer chain break up than in the lower moisture content example. Table 1 shows that meltblown fibers made of the lower IV poly(ethylene terephthalate) of Example 1 have a smaller average fiber diameter than the conventional IV poly(ethylene terephthalate) of Comparative Example A. The lower intrinsic viscosity and weight average molecular weight of the poly(ethylene terephthalate) from the fibers of Example 1 allowed the fibers to be drawn to smaller average fiber diameters.

Example 2

Meltblown monocomponent fibers were formed according to the procedure of Example 1 except that poly(trimethylene terephthalate) was used in place of the poly(ethylene terephthalate). The poly(trimethylene terephthalate) resin was had an intrinsic viscosity of 0.70 dl/g. The poly(trimethylene terephthalate) was dried for 8 hours at 110° C. This polymer was meltblown according to the process of Example 1, except that the extruder was heated to about 518° F. (270° C.) and the die of the spin pack was heated to about 518° F. (270° C.). The average fiber diameter is reported in Table 1.

Comparative Example B

Meltblown monocomponent fibers were formed according to the procedure of Example 2 except that the poly(trimethylene terephthalate) resin had a higher intrinsic viscosity of 0.84 dl/g. The average fiber diameter is reported in Table 1.

Table 1 shows that meltblown fibers made with the lower intrinsic viscosity poly(trimethylene terephthalate) of Example 2 have a smaller average fiber diameter than the fibers produced from the higher intrinsic viscosity poly(trimethylene terephthalate) of Comparative Example B.

TABLE 1

MELTBLOWN FIBER PROPERTIES

| Example | PET IV (dl/g) | PTT IV (dl/g) | Average Fiber Diameter (micron) |
|---|---|---|---|
| 1 | 0.34 | | 3.6 |
| A | 0.59 | | 4.9 |
| 2 | | 0.70 | 2.9 |
| B | | 0.84 | 5.5 |

PET = poly(ethylene terephthalate)
PTT = poly(trimethylene terephthalate)

Example 3

A meltblown bicomponent web was made with a poly(ethylene terephthalate) component and a second component comprising a polyethylene/poly(butylene terephthalate) blend. This meltblown web was incorporated into a spunbond-meltblown-spunbond composite sheet.

In the meltblown web, the poly(ethylene terephthalate) component was Crystar® polyester (Merge 3949), available from DuPont. The poly(ethylene terephthalate) had an intrinsic viscosity of 0.63 dl/g and a weight average molecular weight of 35,600. The poly(ethylene terephthalate) was used as received without any conditioning or drying and had a moisture content of about 1300 ppm. The polyethylene/poly(butylene terephthalate) bicomponent blend contained 90% by weight linear low density polyethylene with a melt index of 150 g/10 minutes (measured according to ASTM D-1238) available from Dow as ASPUN 6831A and 10% by weight poly(butylene terephthalate) available from Hoechst as Merge 1300A. The bicomponent polymer blend was prepared by mixing the polyethylene and poly(butylene terephthalate) in an extruder at 265° C. The poly(ethylene terephthalate) polymer was heated to 575° F. (300° C.) and the polyethylene/poly(butylene terephthalate) bicomponent polymer blend was heated to 510° F. (265° C.) in separate extruders. The two polymer components were separately extruded, filtered and metered to a bicomponent spin pack arranged to provide a side-by-side filament cross section. The die of the spin pack was heated to 600° F. (315° C.). The die had 601 capillary openings arranged in a 24 inch (61 cm) line. The polymers were spun through each capillary at a polymer throughput rate of 0.80 g/hole/min. Attenuating air was heated to a temperature of 615° F. (323° C.) and supplied at a rate of 300 standard cubic feet per minute (8.5 m³/min) through two 0.8 mm wide air channels. The two air channels ran the length of the 24 inch line of capillary openings, with one channel on each side of the line of capillaries set back 1 mm from the capillary openings. The poly(ethylene terephthalate) was supplied to the spin pack at a rate of 12 kg/hr and the polyethylene/poly(butylene terephthalate) was supplied to the spin pack at a rate of 12 kg/hr. A bicomponent meltblown web was produced that was 50 weight percent poly(ethylene terephthalate) and 50 weight percent polyethylene/poly(butylene terephthalate). The filaments were collected on a moving forming screen to produce a meltblown web. The meltblown web was collected on a roll. The meltblown web had a basis weight of 17 g/m².

As the poly(ethylene terephthalate) was meltblown, hydrolytic and thermal degradation occurred which reduced the molecular weight and hence the intrinsic viscosity of the polymer forming the meltblown fibers. The poly(ethylene terephthalate) in the meltblown fibers had an intrinsic viscosity of 0.34 dl/g and a weight average molecular weight of 16,500.

The spunbond outer layers were bicomponent fibers with a sheath-core cross section. The spunbond fibers were made using an apparatus like that described above with regard to FIG. 4. Spunbond webs with two basis weights (17 g/m² and 24 g/m²) were produced for use in the outer layers of the composite sheet. The spunbond bicomponent fibers were made from linear low density polyethylene with a melt index of 27 g/10 minutes (measured according to ASTM D-1238) available from Dow as ASPUN 6811A, and poly(ethylene terephthalate) polyester with an intrinsic viscosity of 0.63 dl/g and weight average molecular weight of approximately 35,600 available from DuPont as Crystar® polyester (Merge 3949). The polyester resin was crystallized at a temperature of 180° C. and dried at a temperature of 120° C. to a moisture content of less than 50 ppm before use.

The poly(ethylene terephthalate) used in the spunbond layers was heated to 290° C. and the polyethylene was heated to 280° C. in separate extruders. The polymers were extruded, filtered and metered to a bicomponent spin pack maintained at 295° C. and designed to provide a sheath-core filament cross section. The polymers were spun through the spinneret to produce bicomponent filaments with a polyethylene sheath and a poly(ethylene terephthalate) core. The total polymer throughput per spin pack capillary was 1.0 g/min for the 17 g/m² basis weight web and 1.0 g/min for the 24 g/m² web. The polymers were metered to provide filament fibers that were 30% polyethylene (sheath) and 70% polyester (core), based on fiber weight. The resulting smaller, stronger substantially continuous filaments were deposited onto a laydown belt with vacuum suction. The fibers in the two webs (17 g/m² and 24 g/m² basis weights) had an effective diameter in the range of 9 to 12 microns. The resulting webs were separately passed between two thermal bonding rolls to lightly tack the web together for transport using a point bonding pattern at a temperature of 100° C. and a nip pressure of 100 N/cm. The line speed during bonding was 206 m/min for the 17 g/m² basis weight web and 146 m/min for the 24 g/m² basis weight web. The lightly bonded spunbond webs were each collected on a roll.

The composite nonwoven sheet was prepared by unrolling the 17 g/m² basis weight spunbond web onto a moving belt. The meltblown bicomponent web was unrolled and laid on top of the moving spunbond web. The second roll of the 24 g/m² basis weight spunbond web was unrolled and laid on top of the spunbond-meltblown web to produce a spunbond-meltblown-spunbond composite nonwoven web. The composite web was thermally bonded between an engraved oil-heated metal calender roll and a smooth oil heated metal calender roll. Both rolls had a diameter of 455 mm. The engraved roll had a chrome coated non-hardened steel surface with a diamond pattern having a point size of 0.466 mm², a point depth of 0.86 mm, a point spacing of 1.2 mm, and a bond area of 14.6%. The smooth roll had a hardened steel surface. The composite web was bonded at a temperature of 110° C., a nip pressure of 350 N/cm, and a line speed of 20 m/min. The bonded composite sheet was collected on a roll. The final basis weight of this composite nonwoven sheet was 58 g/m². The physical properties of the sheet are reported in Table 2.

Comparative Example C

A composite sheet was formed according to the procedure of Example 3 except that the poly(ethylene terephthalate) was dried for 4 hours at 120° C. prior to meltblowing which produced a lower moisture content of about 50 ppm. The intrinsic viscosity of the poly(ethylene terephthalate) polymer in the meltblown fibers was 0.59 dl/g and the weight average molecular weight was 31,000. The physical properties of the composite sheet are reported in Table 2.

Table 2 shows that a composite sheet made with meltblown fibers made of the lower viscosity poly(ethylene terephthalate) of Example 3 exhibits increased hydrostatic head as compared to the composite sheet of Comparative Example C.

Example 4

A composite sheet was formed according to the procedure of Example 3 except that the air flow rate during the melt blowing process was 310 standard cubic feet per minute (8.8 m³/min) instead of 300 standard cubic feet per minute (8.5 m³/min). The physical properties of the sheet are reported in Table 2.

Comparative Example D

A composite sheet was formed according to the procedure of Comparative Example C except that the air flow rate during the melt blowing process was 500 standard cubic feet per minute (14.1 m³/min) instead of 300 standard cubic feet per minute (8.5 m³/min). The physical properties of the sheet are reported in Table 2.

Table 2 shows a composite sheet made with meltblown fibers made of the lower viscosity poly(ethylene terephthalate) of Example 4 exhibits increased hydrostatic head as compared to the composite sheet of Comparative Example D.

TABLE 2

NONWOVEN WEB PROPERTIES

| Example | Meltblown PET IV (dl/g) | Meltblown PET Mw | Hydrostatic Head (cm) | Frazier+ (m³/min/m²) | Grab Tensile MD (N) | Grab Tensile XD (N) |
|---|---|---|---|---|---|---|
| 3 | 0.34 | 16,500 | 77 | 27 | 143.4 | 77.5 |
| C | 0.59 | 31,000 | 40 | 65 | 139.8 | 86.0 |
| 4 | 0.34 | 16,500 | 83 | 28 | 140.2 | 81.5 |
| D | 0.59 | 31,000 | 58 | 39 | 147.8 | 77.5 |

PET = poly(ethylene terephthalate)
IV = Intrinsic Viscosity
Mw = Weight Averaged Molecular Weight
MD = Machine Direction
XD = Cross Direction
+Frazier Air Permeability

What is claimed is:

1. A multiple component meltblown fiber comprising at least two polymer components which each extend substantially the complete length of said fiber, the fiber comprising between 20% and 98% by weight of a first polymer component selected from the group consisting of poly(ethylene terephthalate) having an intrinsic viscosity of less than 0.45 dl/g, and poly(trimethylene terephthalate) having an intrinsic viscosity of less than 0.80 dl/g, and between 80% and 2% by weight of a second polymer component.

2. The meltblown fiber of claim 1 wherein the fiber has an average effective diameter of less than 10 microns, and wherein the intrinsic viscosity of the poly(ethylene terephthalate) is in the range of 0.20 to 0.45 dl/g and the intrinsic viscosity of the poly(trimethylene terephthalate) is in the range of 0.45 to 0.75 dl/g.

3. The meltblown fiber of claim 2 wherein the intrinsic viscosity of the poly(ethylene terephthalate) is in the range of 0.25 to 0.45 dl/g and the intrinsic viscosity of the poly(trimethylene terephthalate) is in the range of 0.50 to 0.70 dl/g.

4. The meltblown fiber of claim 1 wherein said first polymer component is poly(ethylene terephthalate).

5. The meltblown fiber of claim 4 wherein said second polymer component comprises at least 10% by weight of polyethylene polymer.

6. A web of meltblown fibers, said web comprised of at least 10% multiple component meltblown fibers, said multiple component meltblown fibers comprising at least two polymer components which each extend substantially the complete length of said fibers, said multiple component fibers comprising between 20% and 98% by weight of a first polymer component selected from the group consisting of poly(ethylene terephthalate) having an intrinsic viscosity of less than 0.45 dl/g, and poly(trimethylene terephthalate) having an intrinsic viscosity of less than 0.80 dl/g, and between 80% and 2% by weight of a second polymer component.

7. The web of claim 6 wherein the fibers of the web have an average effective diameter of less than 10 microns, and wherein the intrinsic viscosity of the poly(ethylene terephthalate) is in the range of 0.20 to 0.45 dl/g and the intrinsic viscosity of the poly(trimethylene terephthalate) is in the range of 0.45 to 0.75 dl/g.

8. The web of claim 7 wherein the intrinsic viscosity of the poly(ethylene terephthalate) is in the range of 0.25 to 0.45 dl/g and the intrinsic viscosity of the poly(trimethylene terephthalate) is in the range of 0.50 to 0.70 dl/g.

9. The web of claim 6 wherein the first polymer component is poly(ethylene terephthalate).

10. The web of claim 9 wherein said second polymer component comprises at least 10% by weight of polyethylene polymer.

11. A composite sheet comprising:

a first fibrous layer having a first side and an opposite second side;

said first fibrous layer being a meltblown web comprised of multiple component meltblown fibers having at least two polymer components which each extend substantially the complete length of said fibers, the fibers comprising at least 20% by weight of a first polymer component selected from the group consisting of poly(ethylene terephthalate) having an intrinsic viscosity of less than 0.45 dl/g, and poly(trimethylene terephthalate) having an intrinsic viscosity of less than 0.80 dl/g; and between 80% and 2% by weight of a second polymer component; and a second fibrous layer bonded to said first side of said first fibrous layer, said second fibrous layer comprised of at least 95% by weight of meltspun fibers;

said composite sheet having a basis weight of less than 120 g/m$^2$, and a hydrostatic head of at least 10 cm.

12. The composite sheet of claim 11 wherein at least 10% of the meltblown fibers in said first fibrous layer are multiple component fibers.

13. The composite sheet of claim 11 wherein said first and second polymer components of said bicomponent meltblown fibers are arranged in a side-by-side arrangement.

14. The composite sheet of claim 11 wherein said first polymer component comprises between 20% and 98% by weight of said first fibrous layer and said second polymer component comprises between 80% and 2% of said first fibrous layer, and said second polymer component of said first fibrous layer consists essentially of polyethylene.

15. The composite sheet of claim 14 wherein the meltspun fibers of said second fibrous layer are multiple component fibers having a polyester component and a polyethylene component, wherein the polyester component comprises at least 10% by weight of the second fibrous layer and the polyethylene component comprises at least 10% by weight of the second fibrous layer.

16. A garment comprised of the composite sheet of claim 11.

17. A multiple component meltblown fiber comprising at least two polymer components which each extend substantially the complete length of said fiber, the fiber comprising between 20% and 98% by weight of a first polyester polymer component having a weight average molecular weight of less than 25,000, and between 80% and 2% by weight of a second polymer component.

18. The meltblown fiber of claim 17 wherein said polyester has a weight average molecular weight in the range of 5,000 to 22,000.

19. The meltblown fiber of claim 18 wherein said polyester has a weight average molecular weight in the range of 10,000 to 19,000.

20. The meltblown fiber of claim 17 wherein said polyester is poly(ethylene terephthalate).

* * * * *

UNITED STATES PATENT AND TRADEMARK OFFICE
CERTIFICATE OF CORRECTION

PATENT NO.    : 6,797,655 B2
DATED         : September 28, 2004
INVENTOR(S)   : Rudisill Edgar N., Bansal Vishal and Davis Michael C.

It is certified that error appears in the above-identified patent and that said Letters Patent is hereby corrected as shown below:

<u>Title page,</u>
Item [75], Inventors, insert -- Vishal Bansal, Richmond, VA (US);
Michael C. Davis, Midlothian, VA (US) --

Signed and Sealed this

Nineteenth Day of April, 2005

JON W. DUDAS
*Director of the United States Patent and Trademark Office*